United States Patent [19]

Ogata et al.

[11] Patent Number: 5,332,411
[45] Date of Patent: Jul. 26, 1994

[54] GLASS ARTICLE CUTTING METHOD

[75] Inventors: Haruhiko Ogata, Kanagawa; Hidetoshi Komiya; Katumi Ohgaki, both of Tokyo, all of Japan

[73] Assignee: Toyo Glass Company Limited, Tokyo, Japan

[21] Appl. No.: 977,856

[22] Filed: Nov. 17, 1992

[30] Foreign Application Priority Data

Dec. 2, 1991 [JP] Japan .................................. 3-341744

[51] Int. Cl.$^5$ ...................... C03C 17/02; C03C 17/28; C03B 33/09
[52] U.S. Cl. ...................... 65/60.1; 65/112; 65/113; 65/105; 219/68; 225/1
[58] Field of Search ...................... 65/40, 60.1, 97, 105, 65/112, 113; 219/68, 69.17; 225/1, 2, 3, 93.5

[56] References Cited

U.S. PATENT DOCUMENTS

| | | |
|---|---|---|
| 3,252,779 | 5/1966 | Rexford . |
| 3,556,366 | 1/1971 | Kim ............................ 225/1 |
| 3,584,773 | 6/1971 | Grove ........................ 225/2 |
| 3,762,903 | 10/1973 | Hamilton ................... 65/107 |
| 4,034,265 | 7/1977 | DuRocher et al. . |
| 4,035,265 | 7/1977 | Saunders . |
| 4,046,645 | 9/1977 | Yoshida et al. . |
| 4,052,584 | 10/1977 | Reznicek .................... 219/69.17 |
| 4,097,637 | 6/1978 | Loria et al. . |
| 4,113,162 | 9/1978 | Boehm et al. .............. 225/2 |
| 4,232,809 | 11/1980 | Boehm et al. .............. 225/93.5 |
| 4,368,064 | 1/1983 | Siegel ......................... 65/105 |
| 4,559,115 | 12/1985 | Inoue .......................... 219/68 |
| 4,847,463 | 7/1989 | Levy et al. .................. 219/69.17 |

FOREIGN PATENT DOCUMENTS

| | | |
|---|---|---|
| 54-41490 | 4/1979 | Japan . |
| 55-6963 | 2/1980 | Japan . |
| 55-39085 | 10/1980 | Japan . |
| 1167248 | 6/1989 | Japan . |

*Primary Examiner*—W. Gary Jones
*Assistant Examiner*—Steven D. Griffin
*Attorney, Agent, or Firm*—Sughrue, Mion, Zinn, Macpeak & Seas

[57] ABSTRACT

A glass article cutting method by which a glass article can be cut not only along a linear line but also along a curved line of a desired profile and can be cut comparatively readily even if the glass article has a concave or convex portion on a face thereof or even if the glass article has a complicated three-dimensional profile. A conductive coating material such as colloidal carbon is applied in a linear line or a curved line on a surface of a glass article to be cut, and a high voltage is applied from a pair of positive and negative electrodes to the line of the conductive coating material to energize the conductive coating material to generate heat thereby to cut the glass article by thermal stress caused by the heat.

5 Claims, 3 Drawing Sheets

GLASS ARTICLE CUTTING METHOD

BACKGROUND OF THE INVENTION

1. Field of the Invention

This invention relates to a method of cutting a glass article along a planned cutting line by thermal stress.

2. Description of the Related Art

A glass article cutting method of the type mentioned is already known. An exemplary one of conventional glass article cutting methods is disclosed, for example, in Japanese Patent Laid-Open Application No. 1-167248. According to the conventional glass article cutting method, a nichrome wire is laid along a planned cutting line on a surface of a glass plate, and electric current is supplied to the nichrome wire while mechanical stress is applied to the glass plate in a direction perpendicular to the planned cutting line, whereafter water is dropped to cause water drops to stick to an end face portion of the glass plate so as to effect thermal stress cutting of the glass plate.

However, according to the conventional glass article cutting method, a nichrome wire which is a ready-made wire stock is employed, and the nichrome wire is laid and energized on a surface of a glass article. Accordingly, the conventional glass article cutting method is disadvantageous in the following points.

First, while there is no trouble when the planned cutting line is a linear line, it is difficult to cut a glass article along a curved line particularly of a free configuration.

Further, the cross contactness between a surface of a glass article and a nichrome wire is low, and consequently, the thermal efficiency is low.

Furthermore, when there is a concave or convex portion on a face of the glass article, a nichrome wire is spaced away from the face of the glass article at the concave or convex portion, and consequently, the glass article cannot be cut at the portion.

In addition, it is very difficult to contact a nichrome wire with a surface of a glass article having a complicated profile such as, for example, a three-dimensional profile. Accordingly, the glass article cutting method cannot be applied well to cutting of a glass article having a complicated profile.

SUMMARY OF THE INVENTION

It is an object of the present invention to provide a glass article cutting method by which a glass article can be cut not only along a linear line but also along a curved line of a complicated profile.

It is another object of the present invention to provide a glass article cutting method by which, even if there is a concave or convex portion on a face of a glass article to be cut or even if a glass article has a complicated three-dimensional profile, the glass article can be cut comparatively readily.

In order to attain the objects, according to the present invention, there is provided a method of cutting a glass article, which comprises the steps of applying a conductive coating material such as colloidal carbon or conductive glass paste in a linear or curved line on a surface of a glass article to be cut, and applying a high voltage across the line of the conductive coating material by way a pair of positive and negative electrodes to energize the conductive coating material to generate heat so as to cut the glass article by thermal stress caused by the heat.

When a high voltage is applied from the positive and negative electrodes across a conductive coating material applied in a line on a surface of a glass article to be cut so that electric current flows through the conductive material, the line of the conductive coating material generates heat. Consequently, thermal stress is applied to the portion of the glass article along the line of the conductive coating material, and the glass article is cut along the line of the conductive coating material by the thermal stress.

With the glass article cutting method, since a conductive coating material which can be drawn freely on a surface of a glass article to be cut is employed as a conductive line, the glass article can be cut not only along a linear line but also along a free curved line. Further, since such conductive coating material is superior in close contact with a surface of a glass article, the glass article can be cut at a high thermal efficiency. Furthermore, even if the glass article has a concave or convex portion on a face thereof or has a complicated three-dimensional profile, it can be cut readily without a particular trouble.

At the conductive coating material applying step, the conductive coating material may be applied in an endless line. A portion of the glass article delineated by the endless line can thus be cut away from the glass article.

Preferably, the glass article cutting method further comprises the step of applying mechanical stress to the glass article simultaneously when the conductive coating material is energized to apply thermal stress to the glass article at the high voltage applying step. The time required to cut the glass article is decreased and a clean cut face can be obtained.

Preferably, the positive and negative electrodes are spaced away from the conductive coating material, and the high voltage applying step includes the step of blowing flame from a pair of burners to the spacings between the conductive coating material and the positive and negative electrodes so that the conductive coating material may be energized by way of the flame. Preferably, the surface of the glass article is moved while the conductive coating is energized by way of the flame. The thermal stress is thus uniformed and a cutting time is reduced.

Preferably, the high voltage applied to the conductive coating material has a high frequency. This assures a high degree of safety in cutting operation.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

The glass article cutting method according to the present invention was actually applied to cut several glass articles along lines of various profiles. The actual examples will be described below.

Embodiment 1

Figure 1:
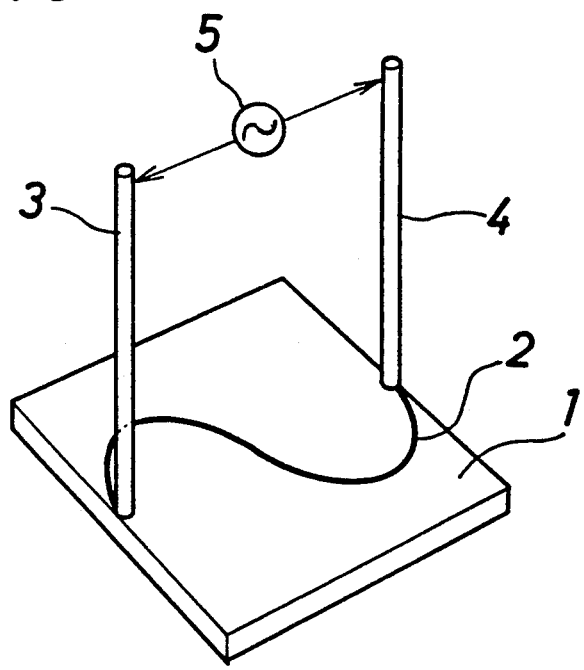
FIG. 1 is a schematic perspective view of a glass plate being cut along a curved line showing a preferred embodiment of the present invention.

Referring first to FIG. 1, there is shown a glass plate being cut along a curved line in accordance with the present invention. Colloidal carbon was applied along a planned cutting line of a sine curve-like curved profile to a surface of a glass plate 1 to be cut, and ends of a pair of positive and negative electrodes 3 and 4 were contacted with the opposite ends of the colloidal carbon line 2 and a high voltage of a high frequency was applied from a high frequency high voltage source 5 to the end of the positive and negative electrodes 3 and 4 to energize the colloidal carbon line 2. In this instance, the thickness of the glass plate 1 was 15 mm, the resistance of the colloidal carbon was 85 K$\Omega$, and the voltage applied was 1.8 KV, and the heating temperature for the glass plate 1 by electric current flowing through the colloidal carbon line 2 was 100 to 500° C. As a result, the glass plate 1 was cut along the curved line after about 12 seconds after starting of application of the voltage.

Embodiment 2

Figure 2:
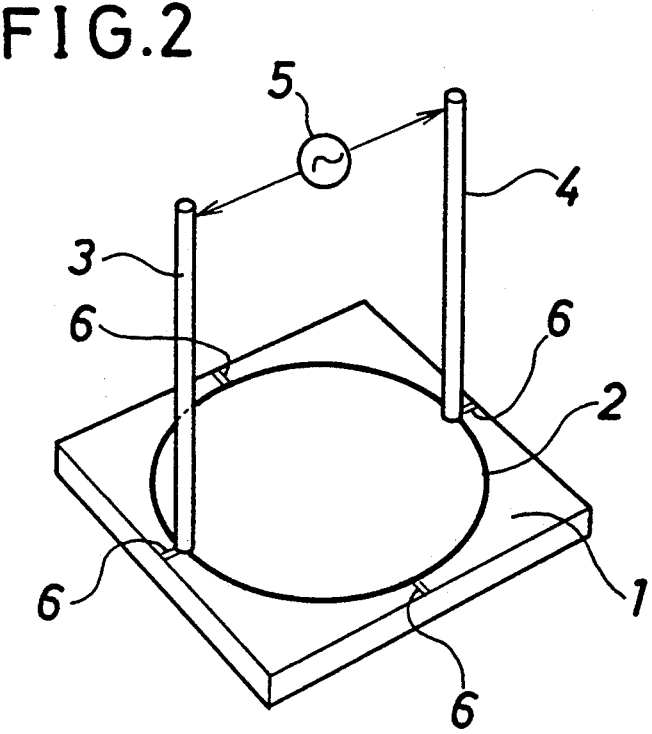
FIG. 2 is a schematic perspective view of a glass plate being cut along a circular line showing another preferred embodiment of the present invention.

Referring now to FIG. 2, colloidal carbon was applied along a circular planned cutting line to a surface of a glass plate 1, and the ends of the positive and negative electrodes 3 and 4 were contacted with a pair of diametrical points of the circular colloidal carbon line 2 and a high voltage of a high frequency was applied from the high frequency high voltage source 5 to energize the colloidal carbon line 2. In this instance, the thickness of the glass plate 1 was 10 mm, the resistance of the colloidal carbon was 10 K$\Omega$, and the voltage applied was 1.0 KV. As a result, the glass plate 1 was cut circularly after about 25 seconds after starting of application of the voltage. In order to facilitate cutting away of the portion to be cut circularly, for example, four cuts 6 may be applied from the circular planned cutting line to the end faces of the glass plate 1 in advance using a diamond blade or a like means.

Embodiment 3

Figure 3:
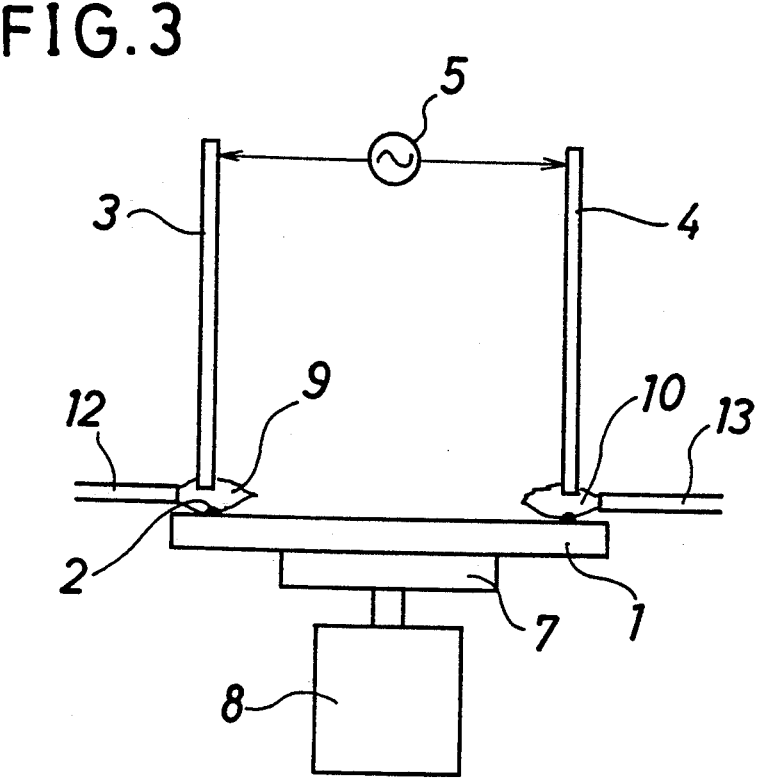
FIG. 3 is a schematic side elevational view of a glass plate being cut with flame used to flow electric current therethrough showing a further preferred embodiment of the present invention.

A circular colloidal carbon line 2 was drawn on a surface of a glass plate 1 similarly as in FIG. 2, and four cuts were applied in advance similarly to the surface of the glass plate 1. The glass plate 1 was placed on a turntable 7 as shown in FIG. 3 and rotated by the turntable 7. Referring to FIG. 3, the ends of the positive and negative electrodes 3 and 4 between which the high frequency high voltage source 5 was connected are spaced above away from the colloidal carbon line 2 by a predetermined small distance, and while the glass plate 1 is being rotated, flames 9 and 10 from a pair of energizing gas burners 12 and 13 were blown into the spacings between the circular colloidal carbon line 2 and the positive and negative electrodes 3 and 4, respectively, so that the circular colloidal carbon line 2 was energized by way of the flame 9 and 10. In this instance, the thickness of the glass plate 1 was 15 mm, the resistance of the colloidal carbon was 30 K$\Omega$, the voltage applied was 1.5 KV, the flame was obtained by combustion of mixture of town gas and air, and the speed of rotation of the turntable 7 was 10 rpm. The glass plate 1 was cut circularly after about 18 seconds after starting of application of the voltage.

Embodiment 4

Figure 4:
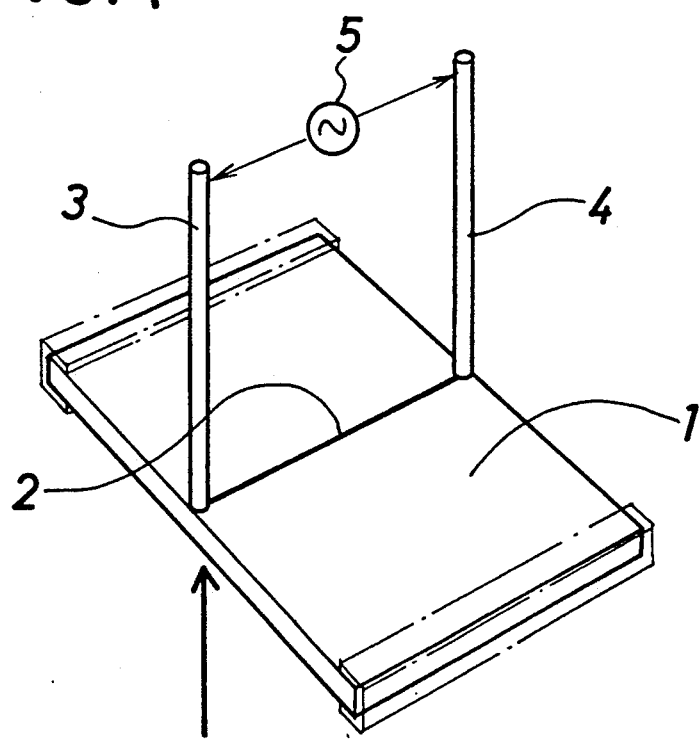
FIG. 4 is a schematic perspective view of a glass plate being cut along a linear line showing a still further preferred embodiment of the present invention.

Referring to FIG. 4, a colloidal carbon line 2 was drawn in the form of a linear line at a mid portion of a surface of a glass plate 1, and the opposite ends of the glass plate 1 was held fixed. In this condition, mechanical stress was applied to the glass plate 1 in such a manner as to push up a central portion of the glass plate 1 from below while a high voltage of a high frequency from the high frequency high voltage source 5 was applied from the positive and negative electrodes 3 and 4 to the opposite ends of the colloidal carbon 2. In this instance, the thickness of the glass plate 1 was 19 mm, the resistance of the colloidal carbon was 50 K$\Omega$ and the voltage applied was 1.8 KV. Consequently, the glass plate 1 was cut clean along the linear line in a short period of time of about 2 seconds after starting of application of the voltage.

Embodiment 5

Figure 5:
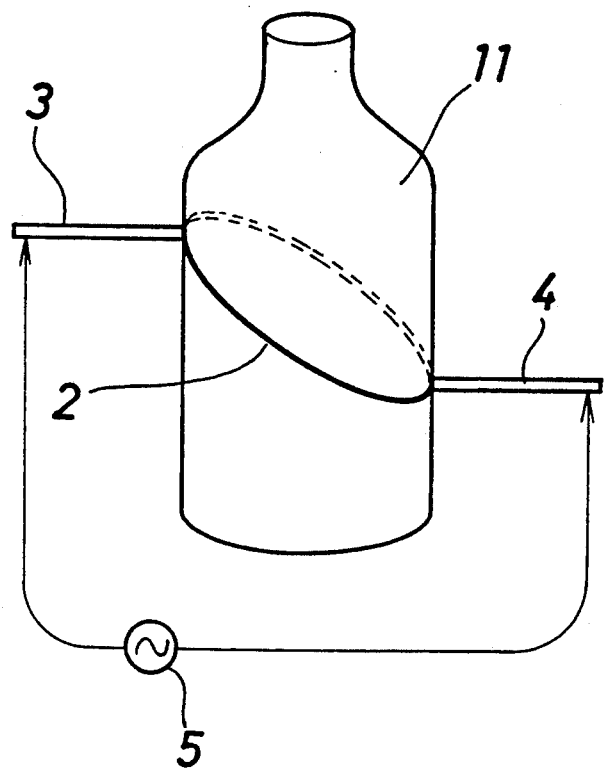
FIG. 5 is a schematic perspective view of a glass bottle being cut along a circular line showing a yet further preferred embodiment of the present invention.

Referring to FIG. 5, a colloidal carbon line 2 was drawn on an outer cylindrical face of a glass bottle 11 in such a manner as to extend annularly, and the ends of the positive and negative electrodes 3 and 4 were contacted with a pair of two diametrically opposite points of the annular colloidal carbon line 2 and a high voltage was applied across the annular colloidal carbon line 2. In this instance, the thickness of the glass bottle 1 was 2 mm, the resistance of the colloidal carbon was 25 K$\Omega$ and the voltage applied was 1.0 KV. As a result, the glass bottle 11 was cut along the annular colloidal carbon line 2 in about 9 seconds after starting of application of the voltage.

While the embodiments described above employ colloidal carbon as a conductive coating material, some other conductive material such as conductive glass paste or metal paste of copper or of some other metal may be employed in place of the colloidal carbon. Further, while the high frequency high voltage source 5 was employed in the examples in order to assure the safety, the voltage to be applied to a line of a conductive coating material need not have a high frequency.

Having now fully described the invention, it will be apparent to one of ordinary skill in the art that many changes and modifications can be made thereto without departing from the spirit and scope of the invention as set forth herein.

What is claimed is:

1. A method of cutting a glass article, comprising the steps of:
  applying a conductive coating material including one of a colloidal carbon and a conductive glass paste in a linear or curved line on a surface of a glass article to be cut; and
  applying a high voltage across the line of the conductive coating material using a pair of positive and negative electrodes to energize the conductive coating material to generate heat so as to cut the glass article by thermal stress caused by the heat, wherein said positive and negative electrodes are spaced away from the conductive coating material to respectively define spaces therebetween, and the high voltage applying step includes the step of respectively blowing a flame from a pair of burners into the spaces between the conductive coating material and said positive and negative electrodes so that the conductive coating material may be energized by way of the flame.

2. A glass article cutting method as claimed in claim 1, wherein, at the conductive coating material applying step, the conductive coating material is applied in an endless line.

3. A glass article cutting method as claimed in claim 1, further comprising the step of applying mechanical stress to the glass article simultaneously to said high voltage applying step.

4. A glass article cutting method as claimed in claim 1, wherein the surface of the glass article is moved while the conductive coating is energized by way of the flame.

5. A glass article cutting method as claimed in claim 1, wherein the high voltage applied to the conductive coating material has a high frequency.

* * * * *